United States Patent [19]

Meissner

[11] 4,345,918

[45] Aug. 24, 1982

[54] PROCESS FOR PURIFICATION OF GAS STREAMS

[75] Inventor: Herman P. Meissner, Winchester, Mass.

[73] Assignee: Institute of Gas Technology, Chicago, Ill.

[21] Appl. No.: 7,988

[22] Filed: Jan. 31, 1979

[51] Int. Cl.³ ............................................. B01D 53/14
[52] U.S. Cl. .......................................... 55/38; 55/46; 55/48; 55/56; 55/68; 55/73
[58] Field of Search ................... 55/38, 46, 48, 56, 68, 55/73, 93, 94

[56] References Cited

U.S. PATENT DOCUMENTS

| | | | |
|---|---|---|---|
| 3,201,918 | 8/1965 | Sennewald et al. | 55/38 |
| 3,773,896 | 11/1973 | Preusser et al. | 55/68 X |
| 3,880,615 | 4/1975 | Grunewald et al. | 55/68 X |
| 4,080,424 | 3/1978 | Miller et al. | 55/68 X |

Primary Examiner—John Adee
Attorney, Agent, or Firm—Thomas W. Speckman

[57] ABSTRACT

A process for separation of carbon dioxide and sulfur containing compounds from a gas stream including the step of feeding the liquid physical solvent absorbent containing dissolved carbon dioxide and sulfur containing gases into the central region of a fractionating column and introducing liquid physical solvent absorbent substantially free from dissolved gases in the upper region of the fractionating column while maintaining the fractionating column under conditions of temperature and pressure whereby at least one of the undesired gases passes from the upper region of the column and the liquid physical solvent absorbent containing remaining dissolved gases passes from the lower region and introduction of feed to the fractionating column is at a location of the column at approximately the position wherein the column contents composition under operating conditions is the same as the feed composition. The process provides for purification of gas streams under pressurized conditions and regeneration of the physical absorbent separates fuel gases, $CO_2$ and sulfur containing compounds.

16 Claims, 1 Drawing Figure

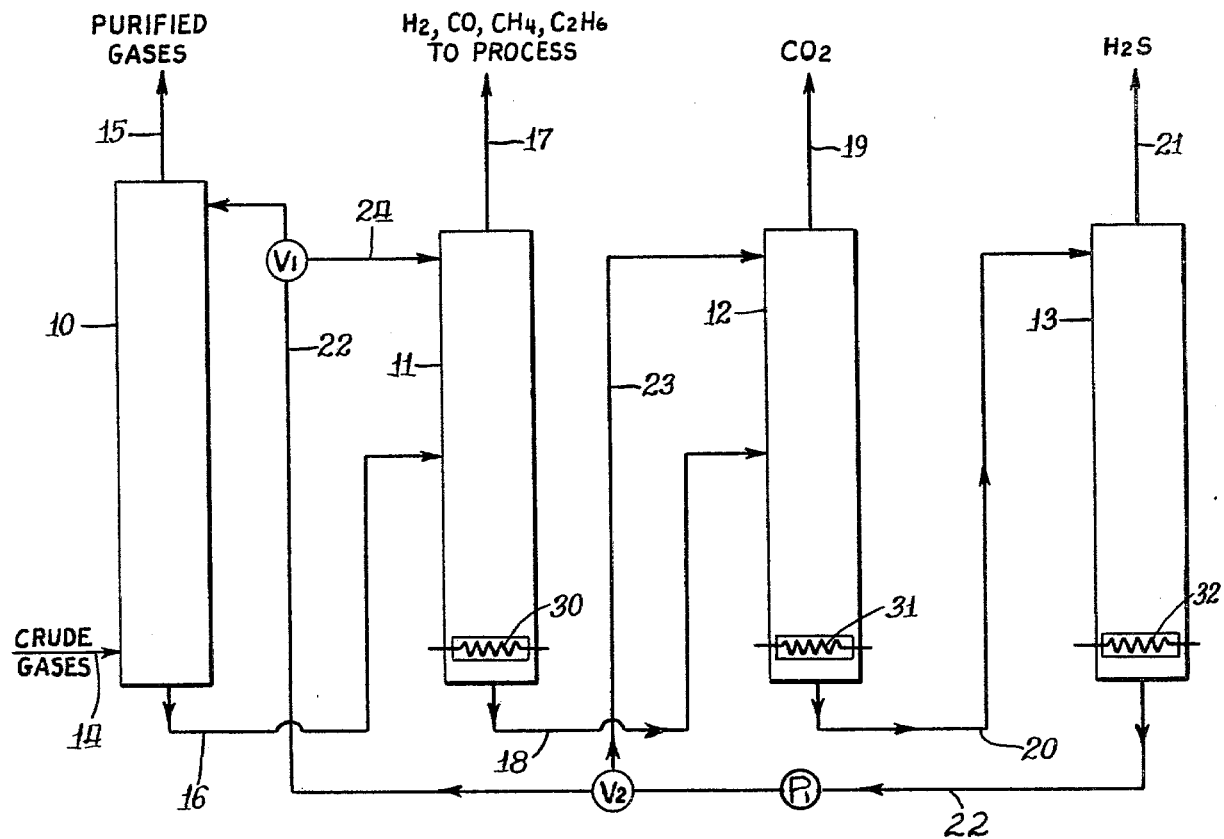

PROCESS FOR PURIFICATION OF GAS STREAMS

This invention is directed to high efficiency, environmentally desirable separation of carbon dioxide and sulfur-containing compounds from a gas stream. The process of this invention is particularly suitable for purification of substitute natural gas and for purification of gas mixtures containing $H_2$ and CO such as are encountered in various chemical processes, like the methanol synthesis. The process produces $H_2S$ and other sulfur containing compounds in concentrations suitable for further processing and produces $CO_2$ in sufficiently pure form to allow its rejection to the atmosphere.

Presently available processes for acid gas removal from a gaseous stream may be classified as those involving chemical reaction and those involving physical absorption with no chemical reaction. In processes involving chemical reaction, the crude gases are typically scrubbed with alkaline salt solutions of weak inorganic acid as taught by U.S. Pat. No. 3,563,695 or with alkaline solutions of organic acids or bases as taught by U.S. Pat. No. 2,177,068. Such chemical reaction processes require regeneration of the chemical solvents, and involve recirculation of large amounts of material. Physical absorption processes are generally used for removing acid components from gaseous streams where the input stream is at high pressures, above about 200 psi, and contains large amounts of acid constituents. The physical absorption of the gas components depends upon use of solvents having selective solubilities for the gaseous components to be removed and is dependent upon pressure and temperature. This selective solubility is unfortunately never perfect, and some of the other gas components, namely $H_2$, $CH_4$, $C_2H_6$, CO, etc., are also dissolved. One low temperature physical absorption operation, carried out at below 0° C., and preferably below about $-30°$ C., uses low-boiling organic solvents such as methanol, as exemplified by U.S. Pat. No. 2,863,527. However, the energy input requirements for cooling are high and the process generally exhibits greater than desired methane and ethane absorption, thereby necessitating large energy inputs for recompression and recovery. Other physical absorbents may be operated at ambient or higher temperatures, such as those utilizing propylene carbonates as taught by U.S. Pat. No. 2,926,751 and those using N-methylpyrrolidone or glycol ethers as taught by U.S. Pat. No. 3,505,784. U.S. Pat. No. 2,649,166 teaches the use of ethers of polyglycols, specifically dimethoxytetraethylene glycol and U.S. Pat. No. 3,773,896 suggests the use of N-substituted morpholene. U.S. Pat. No. 4,080,424 teaches a hybrid physical-chemical absorbent process using the interrelation between a physical solvent and a selective chemical solvent.

Various systems of regeneration of the physical solvent have been used including flashing, stripping, distillation, and combinations thereof. One method of purifying such physical solvents by stripping is taught by U.S. Pat. No. 3,880,615. Many of the absorbent regeneration processes of the prior art do not separate the $CO_2$ and $H_2S$ and other sulfur compounds from the hydrocarbons, predominately methane and ethane, which are also absorbed by the physical solvent. This invention provides a process for purification of gas streams and particularly for separating $CO_2$ and sulfur compounds from fuel gases, producing $CO_2$ in pure enough form to allow its rejection to the atmosphere, producing $H_2S$ and other sulfur containing compounds in concentrations suitable for processing, and recovering dissolved $H_2$, methane, ethane, etc., in a form suitable for use elsewhere.

It is an object of this invention to provide a process for purification of gas streams which provides the separation of $CO_2$ and sulfur compounds from fuel gases removed from the gas streams.

It is another object of this invention to provide a process for purification of gas streams which may be conducted under pressurized conditions normally associated with production of substitute natural gas.

It is yet another object of this invention to provide an energy conserving process for acid gas removal from substitute natural gas.

It is still another object of this invention to provide a process for purification of gas streams utilizing physical absorbents wherein the regeneration of the absorbent separates the fuel gases, $CO_2$ and the sulfur containing compounds.

These and other objects will become apparent upon reading the description and in the drawing showing a preferred embodiment wherein:

The FIGURE shows a simplified schematic plant layout according to one embodiment of the process of this invention.

Conventional extractive distillation involves fractionation in the presence of a solvent having a considerably higher boiling point than the components to be separated. The solvent is added to change the relative volatilities of the components with respect to each other thus making separation of these compounds easier. In practice, this usually involves introducing a carefully selected solvent on the top plate of a fractionating tower and allowing it to flow continuously down through the tower countercurrent to the rising vapors. In the process of the present invention, a suitable solvent is added to insure the presence of a liquid phase on each plate or in each zone in which the components to be separated develop a sufficient concentration for suitable fractionation. The solvent used in the process of this invention does not necessarily serve to change the relative volatilities of the gas stream components. The solvent in the process of this invention serves to insure the presence of liquid absorbent in physical contact with the components to be removed from the gas stream in order to develop concentration of these components for successful fractionation.

Referring to the FIGURE, crude gases enter physical solvent absorber 10 in the lower portion through crude gas input conduit 14, pass countercurrent to a liquid physical absorbent through physical solvent absorber 10 and leave as purified gases through purified gas output conduit 15 in the upper portion of physical solvent absorber 10. The crude gas input, as shown in the figure, is the product of coal gasification after shift and aromatics separation and prior to methanation. The composition of a typical feed gas to the process of this invention may be 41 mol percent $H_2$; 29 mol percent $CO_2$; 15 mol percent $CH_4$; 13 mol percent CO; 1 mol percent $C_2H_6$; and 1 mol percent $H_2S$. When the gas is the product of coal gasification, the pressure in physical solvent absorber 10 may be about 800 to 1200 psia and the temperature of the crude gas input about 60° to 120° F. Any configuration of gas-liquid contact chamber is suitable, desirably one exhibiting a low pressure drop and high volume flow through the chamber. It is preferred that the physical solvent absorber be a vertical tray-type absorber as is well known in the art, the number of trays being governed by the required flow rates and gaseous contents. Packed absorbers may also be used.

Any physical solvent is suitable providing it physically absorbs quantities of $CO_2$ and $H_2S$ from gaseous streams to result in the product stream containing less than 3 volume percent $CO_2$ and less than 1 ppm sulfur while having high rejection properties with respect to the hydrocarbons desired in pipeline-quality gas, under the operating temperature and pressures. The physical solvent must also be liquid at the operating temperatures and pressure and preferably have a low vapor pressure at this temperature. A review of suitable physical solvents is set forth in chapter 5 of the book "Gas and Liquid Sweetening", Dr. R. N. Maddox, 2nd edition, published by Campbell Petroleum Series, Norman, Okla., 1974. Physical absorption agents, or physical solvents, include a wide range of chemical classes including amides, ketones, acetates, esters, alcohols and ethers. These are basically all more or less polar organic chemicals. Specific chemicals which are especially useful as physical solvents include propylene carbonate, glycerol triacetate, butoxy diethylene glycol acetate, methoxy triethylene glycol acetate, as used in the Fluor Solvent Process; dimethyl ether of polyethylene glycol as used in the Selexol Process; N-methyl-2 pyrrolidone as used in the Purisol Process; methanol as used in the Rectisol Process; tri-n-buylphosphate as used in the Estasolvan Process; methyl cyanoacetate, glutaronitrile, trimethylene cyanohydrin, N-methyl pyrrolidone, dimethyl formamide, diethylene glycol dimethyl ether, sulfolane, N-formylmorpholine, and N-formylpiperidine. I prefer to use N-formylmorpholine. Use of N-formylmorpholine with 1 to about 10 weight percent water is especially desired to permit lower operating temperatures in the physical solvent absorber. Especially preferred is a solvent mixture with about 95 percent N-formylmorpholine and 5 percent water. The above physical solvents may be used separately or in compatible mixtures.

The physical solvent absorber liquid bottoms output containing the physically absorbed components from the gas stream including $H_2$, CO, $CH_4$ and higher hydrocarbons, $CO_2$, COS and $H_2S$ are removed through rich absorbent conduit 16 and introduced into the central portion of fractionating column 11. In this example the solvent used was 95% N-formylmorpholine and 5% water.

The rich solvent stream entering fractionating column 11 carries not only dissolved $CO_2$ and sulfur-containing compounds in solution, but also contains at least some hydrogen, CO and hydrocarbons. Fractionating column 11 uses as an extractive agent the same higher boiling physical solvent as used in the physical solvent absorber 10. The clean physical absorbent is introduced through absorbent recycle conduit 24 to the top of fractionating column 11 in a sufficient amount as will be further discussed below. Thus, a liquid phase is provided throughout the length of the column with an overhead gaseous product and a bottoms liquid product. The overhead gaseous product leaves fractionating column 11 through recovery conduit 17 and contains $H_2$, CO, $CH_4$ and higher hydrocarbons which may be fed to a process as fuel. The liquid bottoms leave fractionating column 11 through bottoms conduit 18 and contain dissolved $CO_2$ and $H_2S$.

The liquid bottoms from fractionating column 11 are fed to the central portion of fractionating column 12 which again has liquid media throughout its length, the liquid bottoms from fractionating column 11 being principally the physical absorbent containing dissolved $CO_2$ and $H_2S$ introduced to the central portion, while clean physical absorbent is recycled by absorbent recycle conduit 23 to the top of fractionating column 12. Fractionating column 12 is adjusted to operating conditions so that $CO_2$ gas passes from the top of fractionating column 12 in recovery conduit 19 while the physical absorbent containing dissolved $H_2S$ passes from the bottom of fractionating column 12 through bottoms conduit 20 to stripping tower 13.

The physical absorbent containing $H_2S$ is fed to the top of stripping tower 13 and $H_2S$ is stripped from the physical absorbent by passage through stripping tower 13, the $H_2S$ gas passing from stripping tower 13 through recovery conduit 21 while the purified physical absorbent passes from the bottom of stripping tower 13 through absorbent recycle conduit 22.

The purified absorbent recycle passes through recycle pump $P_1$, to maintain desired liquid flow, and to control valve $V_2$ where a controlled portion is passed through absorbent recycle conduit 23 to the top of fractionating column 12, the remainder continuing through absorbent recycle conduit 22 to control valve $V_1$ where a controlled portion of the purified absorbent is passed to the top of fractionating column 11 and the remainder to the top of physical solvent absorber 10.

Each of the fractionating columns and the stripping tower has a suitable heater means shown in the FIGURE as 30, 31 and 32 to provide the desired temperatures.

While two fractionating columns are shown in the FIGURE, it is readily apparent that additional similar columns may be added before fractionating column 11 to remove other components in pure form, such as ethane or COS (if present), following the same principles of the fractionating columns to be further discussed below.

An important aspect of this invention is the introduction of physical absorbent containing dissolved gases to the central region of the fractionating column and additionally introducing purified (substantially free from dissolved gases) physical absorbent to the upper region of the fractionating column resulting in separation of one or more of the dissolved gases and its removal from the top of column while carrying the remainder of the dissolved gases from the lower region of the column in a bottoms liquid. This is possible due to a liquid phase being provided throughout the column and operation of the column under suitable conditions as determined by the McCabe Thiele diagram as is well known in chemical engineering. The liquid flow below the feed of the physical absorbent containing dissolved gases is greater than the liquid flow above that feed. The flow of purified absorbent to the top of the fractionating column is adjusted to provide necessary absorption both above and below the feed to the central portion. The feed to the central portion is at a location at approximately the position in the fractionating tower where the tower composition is the same as the composition of the feed absorbent containing dissolved gases. The feed may be either just above or just below such position, but generally within about 10 to 15 percent of the active length of the tower from such position.

The process of this invention can be operated at any pressure, but preferrably somewhere in the pressure range of 250 to 1500 psi, thereby providing the feasibility of pressurized gas recovery. That is, operations throughout are substantially at the pressure of the crude gases (line 14 of the FIGURE) eliminating the need for added gas compressors. Thus, both the hydrocarbons and carbon dioxide can be released under pressure conditions.

Attainment of separations of $H_2S$, $CO_2$, $CH_4$, etc., in this process is dependent upon having differences in their K values, the K value of a component being defined as the ratio of its mole fraction in the gas phase divided by its mole fraction in the liquid phase. Numerically, K varies inversely with the total pressure, is somewhat temperature dependent and tends to be independent of composition. Estimated K values using N-formylmorpholine (95%) in 5% water (NFM), and dimethyl ether tetraethyleneglycol (DEMETEG) are shown in Table I at the indicated pressure and 60° F.

TABLE I

|  | DEMETEG | | NFM | |
| --- | --- | --- | --- | --- |
|  | 500 psi | 14.7 psi | 500 psi | 14.7 psi |
| $H_2$ | 90 | | 250 | |
| CO | 55 | | | |
| $CH_4$ | 10 | | 50 | |
| $C_2H_6$ | 2.5 | 55 | 10 | 240 |
| $CO_2$ | 1.8 | 25 | 3.5 | 90 |
| $H_2S$ | 0.8 | 3.6 | 0.3 | 18 |

It is clear that significant differences exist in the use of K values, which is favorable for separations. It is also clear that pressure may readily be used to advantage.

The manner of operation of fractionating column 11 according to this invention may be illustrated by using a McCabe-Thiele analysis assuming a feed ratio of 99 moles $CO_2$ per mole $C_2H_6$. It is found that an overhead gas stream containing 35% $CO_2$, the rest $C_2H_6$, can be attained with eleven theoretical plates with N-formylmorpholine in 5% water at 1000 psi and 100° F. Although a two component system has been analyzed, lighter components ($CH_4$ and $H_2$) will tend to travel with the $C_2H_6$ while heavier components ($H_2S$) will travel with the $CO_2$. The column had seven theoretical plates below the feed and four theoretical plates above the feed. The K values under these conditions are $C_2H_6 = 10$ and $CO_2 = 2.5$. The column input is:

|  | Feed | Recycle |
| --- | --- | --- |
| $CO_2$ | 99 moles | |
| $C_2H_6$ | 1 | |
| NFM | 152 | 168 |
|  | 252 moles | | and the column output is:

|  | Gaseous Overhead | Liquid Bottoms |
| --- | --- | --- |
| $CO_2$ | 0.5 | 98.5 |
| $C_2H_6$ | 0.925 | 0.075 |
| NFM | 0 | 320. |
|  | 1.425 | 418.575 |

While the above disclosure has taught two fractionating columns to remove individual components of absorbent, it is readily apparent to one skilled in the art that the two fractionating columns 11 and 12 could be operated as different zones within the same vessel with side streams to remove each of the components as described above. It is equally apparent that a third column and more could be added if additional components like $C_2H_6$ and $CH_4$ were also to be separated in relatively pure form.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for separation of carbon dioxide and sulfur containing compounds from a gas stream comprising:

passing a gas stream containing undesired gases including carbon dioxide and sulfur containing compounds countercurrent to a liquid physical absorbent, dissolving the undesired gases in said physical absorbent in a physical solvent absorber, removing the purified gases from the upper portion of said physical solvent absorber and removing said liquid physical absorbent containing dissolved gases from the bottom of said physical solvent absorber;

feeding the liquid physical solvent absorbent containing dissolved gases into the central region of a fractionating column, introducing liquid physical absorbent substantially free from dissolved gases in the upper region of said fractionating column and maintaining said fractionating column under conditions of temperature and pressure whereby at least one of said undesired gases passes from the upper region of said fractionating column and is removed from the process, said liquid physical solvent absorbent containing remaining dissolved gases passes from the lower region of said fractionating column, the introduction of feed to said fractionating column being at a location of said column at approximately the position wherein the column contents composition under operating conditions is the same as the feed composition, the pressure in said physical solvent absorber and said fractionating column being substantially the same.

2. The process of claim 1 wherein liquid physical solvent absorbent is maintained for the length of said fractionating column.

3. The process of claim 1 wherein said physical solvent absorber and said fractionating column are at about 250 to 1500 psi providing pressurized gas recovery.

4. The process of claim 1 wherein the process is conducted at the temperature and approximate pressure of the feed gas stream.

5. The process of claim 1 wherein the feed gas stream is the product of coal gasification at a temperature of about 60° to 120° F. and pressure of about 800 to 1200 psia.

6. The process of claim 5 wherein said physical solvent is N-formylmorpholine.

7. The process of claim 1 wherein said physical solvent is N-formylmorpholine.

8. The process of claim 1 wherein said fractionating column is a tray-type absorber.

9. The process of claim 1 wherein said fractionating column is a packed absorber.

10. The process of claim 1 wherein multiple liquid solvent absorbers are connected in series, the liquid physical solvent containing remaining dissolved gases removed from the lower region of an upstream absorber being fed to the central region of the next absorber in series.

11. The process of claim 10 wherein two liquid solvent absorbers are connected in series.

12. In a process for separation of carbon dioxide and sulfur containing compounds from a gas stream the step comprising; feeding a liquid physical solvent absorbent comprising dissolved carbon dioxide and sulfur containing compounds from a physical solvent absorber into the central region of a fractionating column, introducing liquid physical absorbent substantially free from dissolved gases in the upper region of said fractionating column and maintaining said fractionating column under conditions of temperature and pressure whereby at least one of said undesired gases passes from the upper region of said fractionating column and is removed from the process, said liquid physical solvent absorbent containing remaining dissolved gas passes from the lower region of said fractionating column, the introduction of feed to said fractionating column being at a location of said column at approximately the position wherein the column contents composition under operating conditions is the same as the feed composition, the pressure in said physical solvent absorber and said fractionating column being substantially the same.

13. In the process of claim 12 wherein said liquid physical solvent absorbent containing remaining dissolved gas from the lower region of said fractionating column is introduced as feed into the central region of a second fractionating column connected in series with said fractionating column; introducing liquid physical absorbent substantially free from dissolved gases in the upper region of said second fractionating column and maintaining said second fractionating column under conditions of temperature and pressure whereby at least one of said undesired gases passes from the upper region of said second fractionating colum and is removed from the process, said liquid physical solvent absorbent containing remaining dissolved gas passes from the lower region of said second fractionating column, the introduction of feed to said second fractionating column being at a location of said second column at approximately the position wherein the column contents composition under operating conditions is the same as the feed composition.

14. In the process of claim 12 wherein liquid physical solvent absorbent is maintained for the length of said fractionating column.

15. In the process of claim 12 wherein said physical solvent absorber and said fractionating column are at about 250 to 1500 psi providing pressurized gas recovery.

16. In the process of claim 12 wherein said fractionating column is a tray-type absorber.